(12) United States Patent
Gregori

(10) Patent No.: US 11,488,224 B2
(45) Date of Patent: Nov. 1, 2022

(54) METHOD, MEDIUM, AND SYSTEM FOR A USER INTERFACE FOR COMPARING DIGITAL CONTENT ITEMS

(71) Applicant: SAP SE, Walldorf (DE)

(72) Inventor: Lars Gregori, Munich (DE)

(73) Assignee: SAP SE, Walldorf (DE)

(*) Notice: Subject to any disclaimer, the term of this patent is extended or adjusted under 35 U.S.C. 154(b) by 209 days.

(21) Appl. No.: 16/702,838

(22) Filed: Dec. 4, 2019

(65) Prior Publication Data
US 2021/0174420 A1    Jun. 10, 2021

(51) Int. Cl.
*G06Q 30/00*    (2012.01)
*G06Q 30/06*    (2012.01)

(52) U.S. Cl.
CPC ..... *G06Q 30/0629* (2013.01); *G06Q 30/0627* (2013.01)

(58) Field of Classification Search
CPC .............. G06Q 30/0629; G06Q 30/0627
See application file for complete search history.

(56) References Cited

U.S. PATENT DOCUMENTS

| | | | | |
|---|---|---|---|---|
| 7,996,282 B1* | 8/2011 | Scott | ................ | G06Q 30/0603 707/752 |
| 9,489,400 B1* | 11/2016 | Haitani | ................ | G06F 16/26 |
| 10,163,144 B1* | 12/2018 | Wu | ................ | G06Q 30/06 |
| 10,733,656 B1* | 8/2020 | Price | ................ | G06Q 30/0631 |
| 10,803,507 B1* | 10/2020 | Verma | ................ | G06F 3/04847 |
| 10,878,486 B1* | 12/2020 | Aflalo | ................ | H04W 4/33 |
| 2017/0200219 A1* | 7/2017 | Mebed | ................ | G06Q 30/0623 |

OTHER PUBLICATIONS https://eriksilver.me/blogs/blog/replacing-a-shopify-collection-drop-down-filter-with-radio-buttons (Year: 2014).*

* cited by examiner

*Primary Examiner* — Matthew E Zimmerman
(74) *Attorney, Agent, or Firm* — Schwegman Lundberg & Woessner, P.A.

(57) ABSTRACT

Techniques for implementing an improved user interface for efficiently browsing through and comparing digital content items are disclosed. In some embodiments, a method comprises: receiving a request for one or more additional graphical widgets indicating at least one of a plurality of graphical widgets selected by a user for concurrent display with the additional graphical widget(s), the request also indicating at least one attribute value for each one of the at least one of the plurality of graphical widgets, with at least one attribute value having been selected by the user for use in determining the additional graphical widget(s). The additional graphical widget(s) may be determined from amongst a plurality of additional graphical widgets based on the attribute value(s) indicated by the request, and then displayed concurrently on the computing device along with the graphical widget(s) selected by the user for concurrent display with the additional graphical widget(s).

17 Claims, 7 Drawing Sheets

METHOD, MEDIUM, AND SYSTEM FOR A USER INTERFACE FOR COMPARING DIGITAL CONTENT ITEMS

TECHNICAL FIELD

The present application relates generally to the technical field of electrical computer systems, and, in various embodiments, to systems and methods of implementing an improved user interface for efficiently browsing through and comparing graphical widgets or other digital content items.

BACKGROUND

Current user interfaces of online services are inefficient with respect to their ability to enable users to browse through and compare digital content items. For example, when browsing through and comparing products, or other items, via an online service, users often have to navigate back and forth between online pages to determine which products to compare with one another and to view the different pages of the different products. Even in scenarios where a user selects a filter criterion to be used in searching for products, the user cannot conveniently or efficiently replace one of the resulting products with another product for comparison. This inefficient design results in excessive consumption of electronic resources of the underlying computer systems due to factors such as the additional processor workload and consumption of network bandwidth associated with the additional navigation between online pages. This inefficient design also makes the online service difficult and inconvenient to use. The present disclosure addresses these and other technical problems that plague the computer functionality of online services.

BRIEF DESCRIPTION OF THE DRAWINGS

Some example embodiments of the present disclosure are illustrated by way of example and not limitation in the figures of the accompanying drawings, in which like reference numbers indicate similar elements.

FIGS. 4A-4B illustrate different phases of a user interface for efficiently browsing through and comparing digital content items, in accordance with some example embodiments.

DETAILED DESCRIPTION

Example methods and systems for implementing an improved user interface for efficiently browsing through and comparing digital content items are disclosed. In the following description, for purposes of explanation, numerous specific details are set forth in order to provide a thorough understanding of example embodiments. It will be evident, however, to one skilled in the art that the present embodiments can be practiced without these specific details.

The implementation of the features disclosed herein involves a non-generic, unconventional, and non-routine operation or combination of operations. By applying one or more of the solutions disclosed herein, some technical effects of the system and method of the present disclosure are to provide a computer system that is configured to enable a user to replace one or more displayed cards (e.g., graphical widgets), or other digital content items, with one or more additional cards by selecting one or more attribute values of the displayed card(s) to use in determining the additional card(s) and requesting that the displayed card(s) be replaced. By enabling the user to select which attribute value(s) from the displayed cards the user prefers to be maintained in the additional card(s), the underlying computer system enables the user to efficiently direct the determination and presentation of digital content items, thereby reducing the number of navigation operations and network transmissions being performed by the computer system. As a result of the features disclosed herein, the functioning of the computer system is improved. Other technical effects will be apparent from this disclosure as well.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

Figure 1:
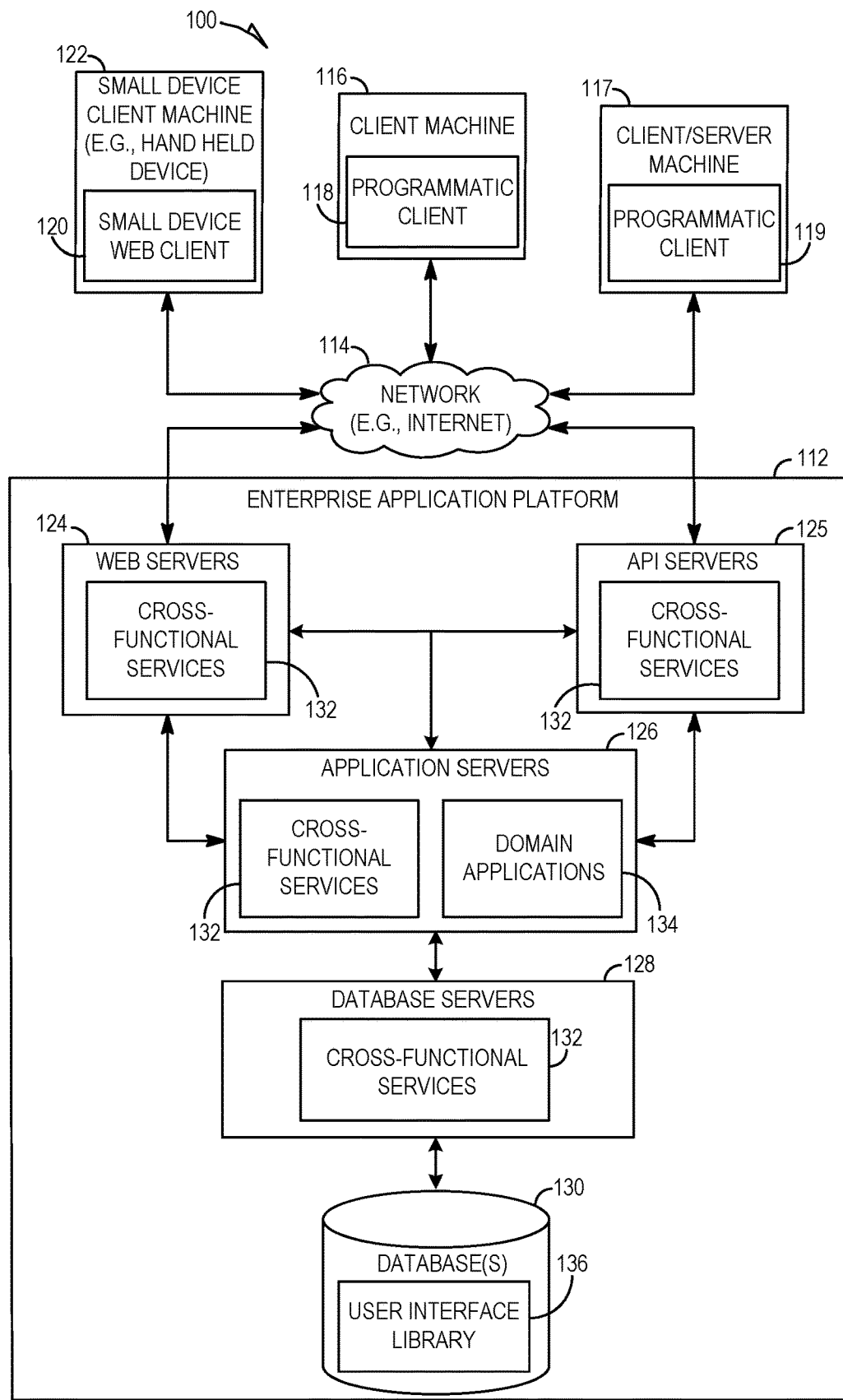
FIG. 1 is a network diagram illustrating a client-server system, in accordance with some example embodiments.

FIG. 1 is a network diagram illustrating a client-server system 100, in accordance with some example embodiments. A platform (e.g., machines and software), in the example form of an enterprise application platform 112, provides server-side functionality, via a network 114 (e.g., the Internet) to one or more clients. FIG. 1 illustrates, for example, a client machine 116 with programmatic client 118 (e.g., a browser), a small device client machine 122 with a small device web client 120 (e.g., a browser without a script engine), and a client/server machine 117 with a programmatic client 119.

Turning specifically to the example enterprise application platform 112, web servers 124 and Application Program Interface (API) servers 125 can be coupled to, and provide web and programmatic interfaces to, application servers 126. The application servers 126 can be, in turn, coupled to one or more database servers 128 that facilitate access to one or more databases 130. The web servers 124, API servers 125, application servers 126, and database servers 128 can host cross-functional services 132. The cross-functional services 132 can include relational database modules to provide support services for access to the database(s) 130, which includes a user interface library 136. The application servers 126 can further host domain applications 134.

The cross-functional services 132 provide services to users and processes that utilize the enterprise application platform 112. For instance, the cross-functional services 132 can provide portal services (e.g., web services), database services, and connectivity to the domain applications 134 for users that operate the client machine 116, the client/server machine 117, and the small device client machine 122. In addition, the cross-functional services 132 can provide an environment for delivering enhancements to existing applications and for integrating third-party and legacy applications with existing cross-functional services 132 and domain applications 134. Further, while the system 100 shown in FIG. 1 employs a client-server architecture, the embodiments of the present disclosure are, of course, not limited to such an architecture, and could equally well find application in a distributed, or peer-to-peer, architecture system.

The enterprise application platform 112 can improve (e.g., increase) accessibility of data across different environments of a computer system architecture. For example, the enterprise application platform 112 can effectively and efficiently enable a user to use real data created from use by one or more end users of a deployed instance of a software solution in a production environment when testing an instance of the software solution in the development environment. The enterprise application platform 112 is described in greater detail below in conjunction with FIGS. 2-6.

Figure 2:
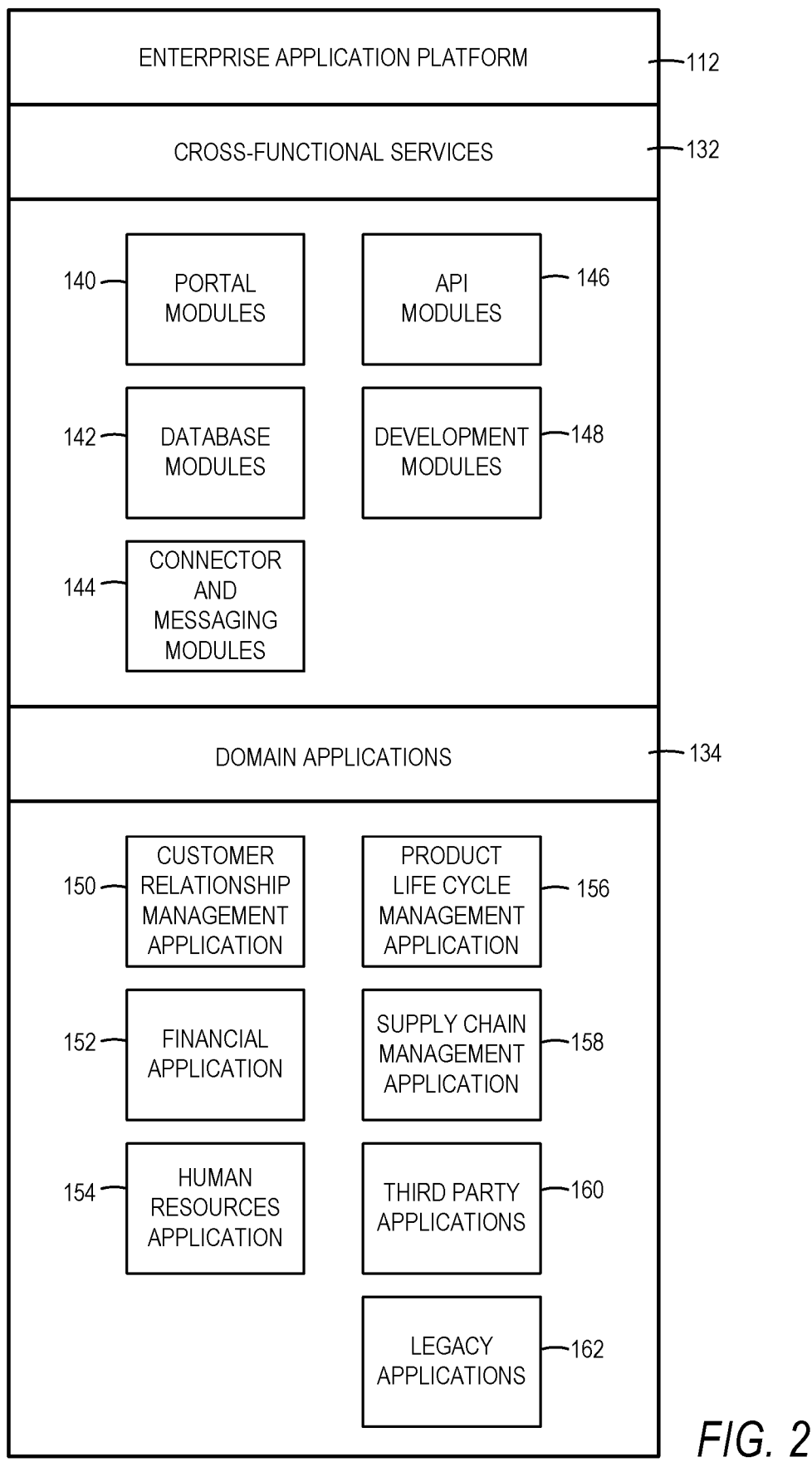
FIG. 2 is a block diagram illustrating enterprise applications and services in an enterprise application platform, in accordance with some example embodiments.

FIG. 2 is a block diagram illustrating enterprise applications and services in an enterprise application platform 112, in accordance with an example embodiment. The enterprise application platform 112 can include cross-functional services 132 and domain applications 134. The cross-functional services 132 can include portal modules 140, database modules 142 (e.g., relational database modules), connector and messaging modules 144, API modules 146, and development modules 148.

The portal modules 140 can enable a single point of access to other cross-functional services 132 and domain applications 134 for the client machine 116, the small device client machine 122, and the client/server machine 117. The portal modules 140 can be utilized to process, author and maintain web pages that present content (e.g., user interface elements and navigational controls) to the user. In addition, the portal modules 140 can enable user roles, a construct that associates a role with a specialized environment that is utilized by a user to execute tasks, utilize services, and exchange information with other users within a defined scope. For example, the role can determine the content that is available to the user and the activities that the user can perform. The portal modules 140 include a generation module, a communication module, a receiving module and a regenerating module. In addition, the portal modules 140 can comply with web services standards and/or utilize a variety of Internet technologies including JAVA®, J2EE, SAP's Advanced Business Application Programming Language (ABAP®) and Web Dynpro, XML, JCA, JAAS, X.509, LDAP, WSDL, WSRR, SOAP, UDDI and MICROSOFT® .NET®.

The database modules 142 can provide support services for access to the database(s) 130, which includes a user interface library 136. The database modules 142 can provide support for object relational mapping, database independence, and distributed computing. The database modules 142 can be utilized to add, delete, update, and manage database elements. In addition, the database modules 142 can comply with database standards and/or utilize a variety of database technologies including SQL, SQLDBC, Oracle, MySQL, Unicode, JDBC, or the like.

The connector and messaging modules 144 can enable communication across different types of messaging systems that are utilized by the cross-functional services 132 and the domain applications 134 by providing a common messaging application processing interface. The connector and messaging modules 144 can enable asynchronous communication on the enterprise application platform 112.

The API modules 146 can enable the development of service-based applications by exposing an interface to existing and new applications as services. Repositories can be included in the platform as a central place to find available services when building applications.

The development modules 148 can provide a development environment for the addition, integration, updating, and extension of software components on the enterprise application platform 112 without impacting existing cross-functional services 132 and domain applications 134.

Turning to the domain applications 134, a customer relationship management application 150 can enable access to and can facilitate collecting and storing of relevant personalized information from multiple data sources and business processes. Enterprise personnel that are tasked with developing a buyer into a long-term customer can utilize the customer relationship management applications 150 to provide assistance to the buyer throughout a customer engagement cycle.

Enterprise personnel can utilize financial applications 152 and business processes to track and control financial transactions within the enterprise application platform 112. The financial applications 152 can facilitate the execution of operational, analytical, and collaborative tasks that are associated with financial management. Specifically, the financial applications 152 can enable the performance of tasks related to financial accountability, planning, forecasting, and managing the cost of finance.

Human resource applications 154 can be utilized by enterprise personnel and business processes to manage, deploy, and track enterprise personnel. Specifically, the human resource applications 154 can enable the analysis of human resource issues and facilitate human resource decisions based on real-time information.

Product life cycle management applications 156 can enable the management of a product throughout the life cycle of the product. For example, the product life cycle management applications 156 can enable collaborative engineering, custom product development, project management, asset management, and quality management among business partners.

Supply chain management applications 158 can enable monitoring of performances that are observed in supply chains. The supply chain management applications 158 can facilitate adherence to production plans and on-time delivery of products and services.

Third-party applications 160, as well as legacy applications 162, can be integrated with domain applications 134 and utilize cross-functional services 132 on the enterprise application platform 112.

Figure 3:
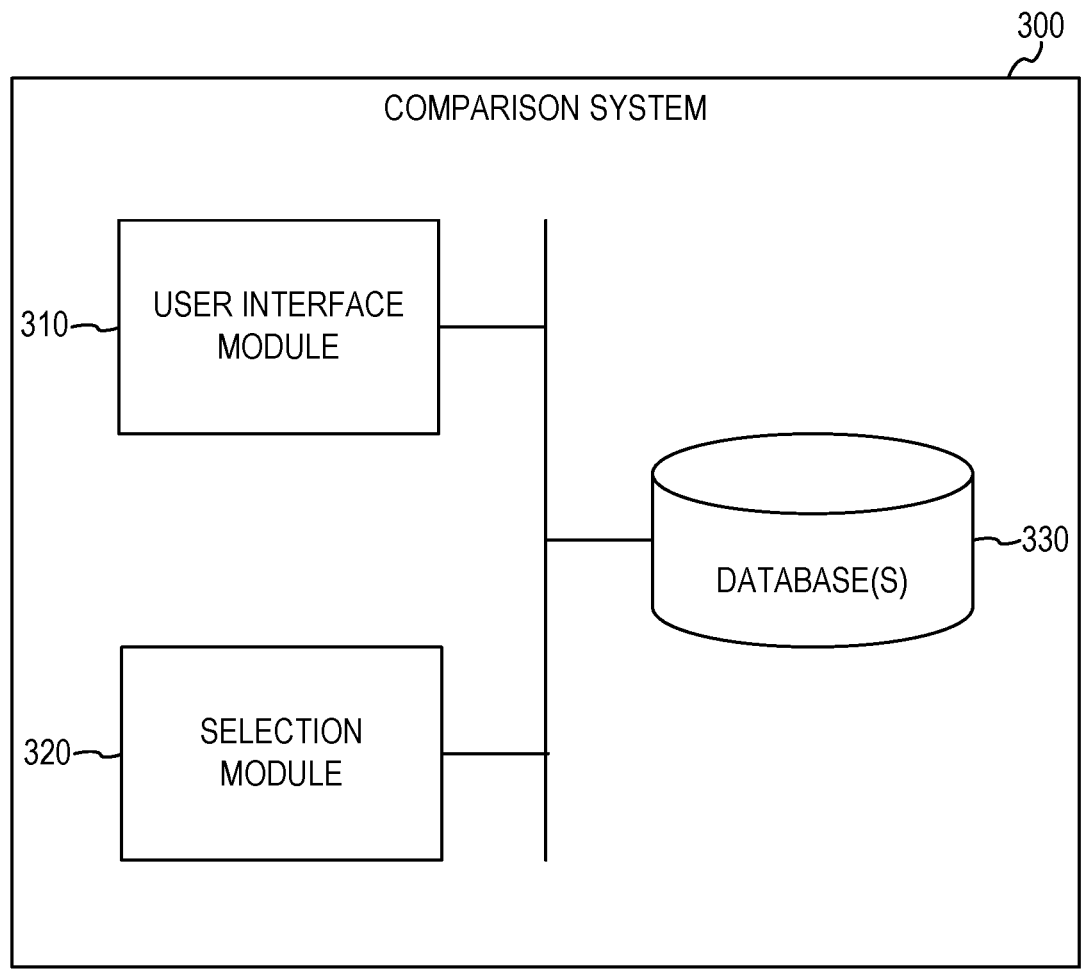
FIG. 3 is a block diagram illustrating a comparison system, in accordance with some example embodiments.

FIG. 3 is a block diagram illustrating a comparison system 300, in accordance with some example embodiments. In some embodiments, the comparison system 300 comprises any combination of one or more of a user interface module 310, a selection module 320, and one or more database(s) 330. The modules 310 and 320 and the database(s) 330 can reside on a computer system, or other machine, having a memory and at least one processor (not shown). In some embodiments, the modules 310 and 320 are incorporated into the application server(s) 126 in FIG. 1 and the database (s) 330 is incorporated into the database(s) 130 in FIG. 1. However, it is contemplated that other configurations of the modules 310 and 320 and the database(s) 330 are also within the scope of the present disclosure.

In some example embodiments, one or more of the modules 310 and 320 are configured to provide a variety of user interface functionality, such as generating user interfaces, interactively presenting user interfaces to the user, receiving information from the user (e.g., interactions with user interfaces), and so on. Presenting information to the user can include causing presentation of information to the user (e.g., communicating information to a device with instructions to present the information to the user). Information may be presented using a variety of means including visually displaying information and using other device outputs (e.g., audio, tactile, and so forth). Similarly, information may be received via a variety of means including alphanumeric input or other device input (e.g., one or more touch screen, camera, tactile sensors, light sensors, infrared sensors, biometric sensors, microphone, gyroscope, accelerometer, other sensors, and so forth). In some example embodiments, one or more of the modules 310 and 320 are configured to receive user input. For example, one or more of the modules 310 and 320 can present one or more graphical user interface (GUI) elements (e.g., drop-down menu, selectable buttons, text field) with which a user can submit input. In some example embodiments, one or more of the modules 310 and 320 are configured to perform various communication functions to facilitate the functionality described herein, such as by communicating with a computing device (e.g., the small device client machine 122, the client machine 116, or the client/server machine 117) via the network 114 using a wired or wireless connection.

In some example embodiments, the user interface module 310 is configured to cause a plurality of cards to be displayed concurrently on a computing device of a user. The user interface module 310 may be configured to cause content, such as the plurality of cards, to be displayed on the computing device via a network external to the computing device (e.g., via the network 114 in FIG. 1). For example, the user interface module 310 may reside on a server and transmit an instruction to the computing device to display the content via the network. Alternatively, the user interface module 310 may reside on the computing device and instruct the computing device to display the content without using a network connection external to the computing device.

A card is a user interface pattern that groups related information in a flexible container visually resembling a playing card or some other visually bounded area. The card acts as a container for a few short, related pieces of information, providing a short representation of a conceptual unit. Each card may comprise a small rectangular module having text and one or more images. In some example embodiments, each card may comprise a graphical widget or some other type of graphic control element. A graphical widget is a user interface element or object with which users may interact and that displays information or provides a specific way for a user to interact with an operating system or an application.

Figure 4A:
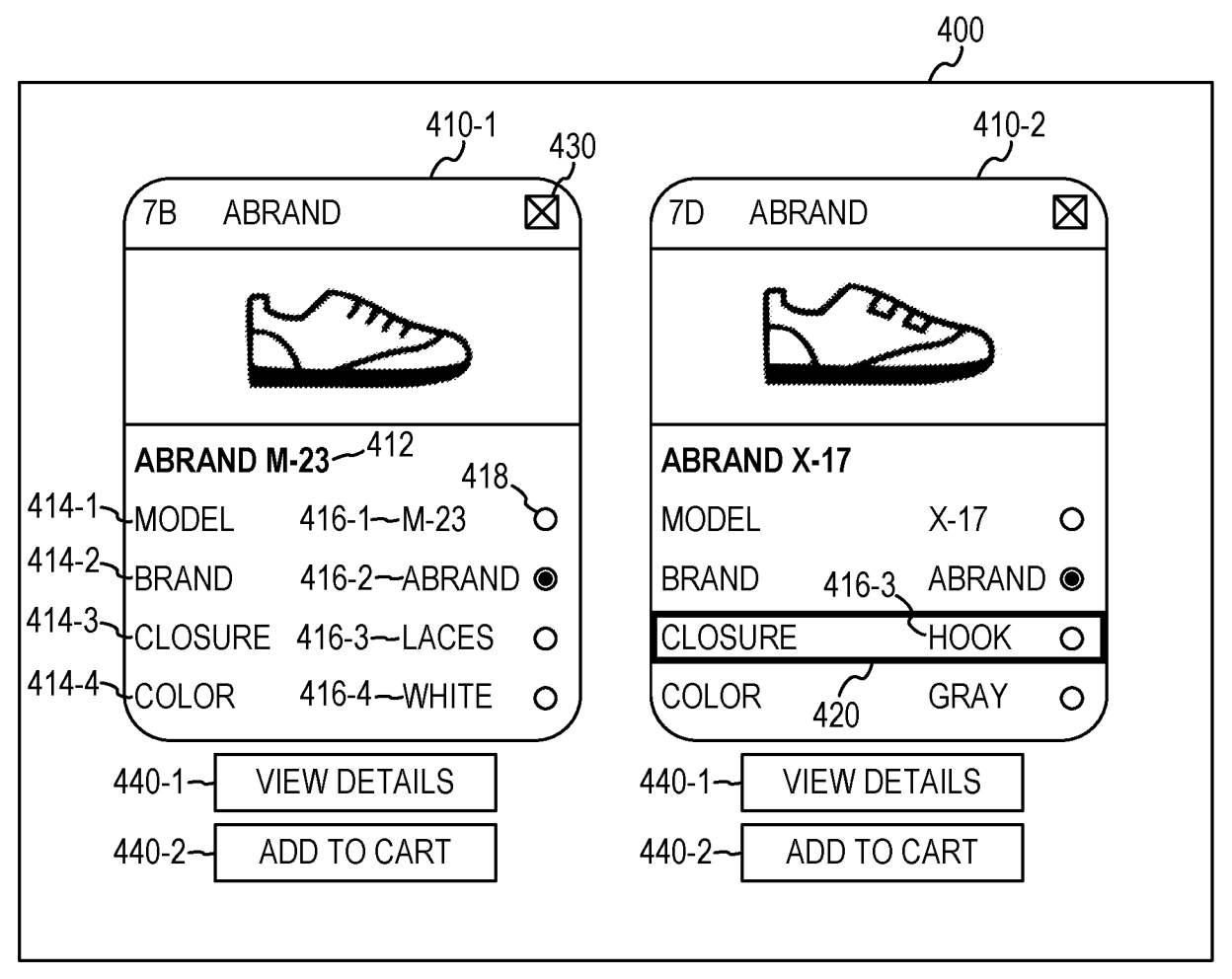
Figure 4B:
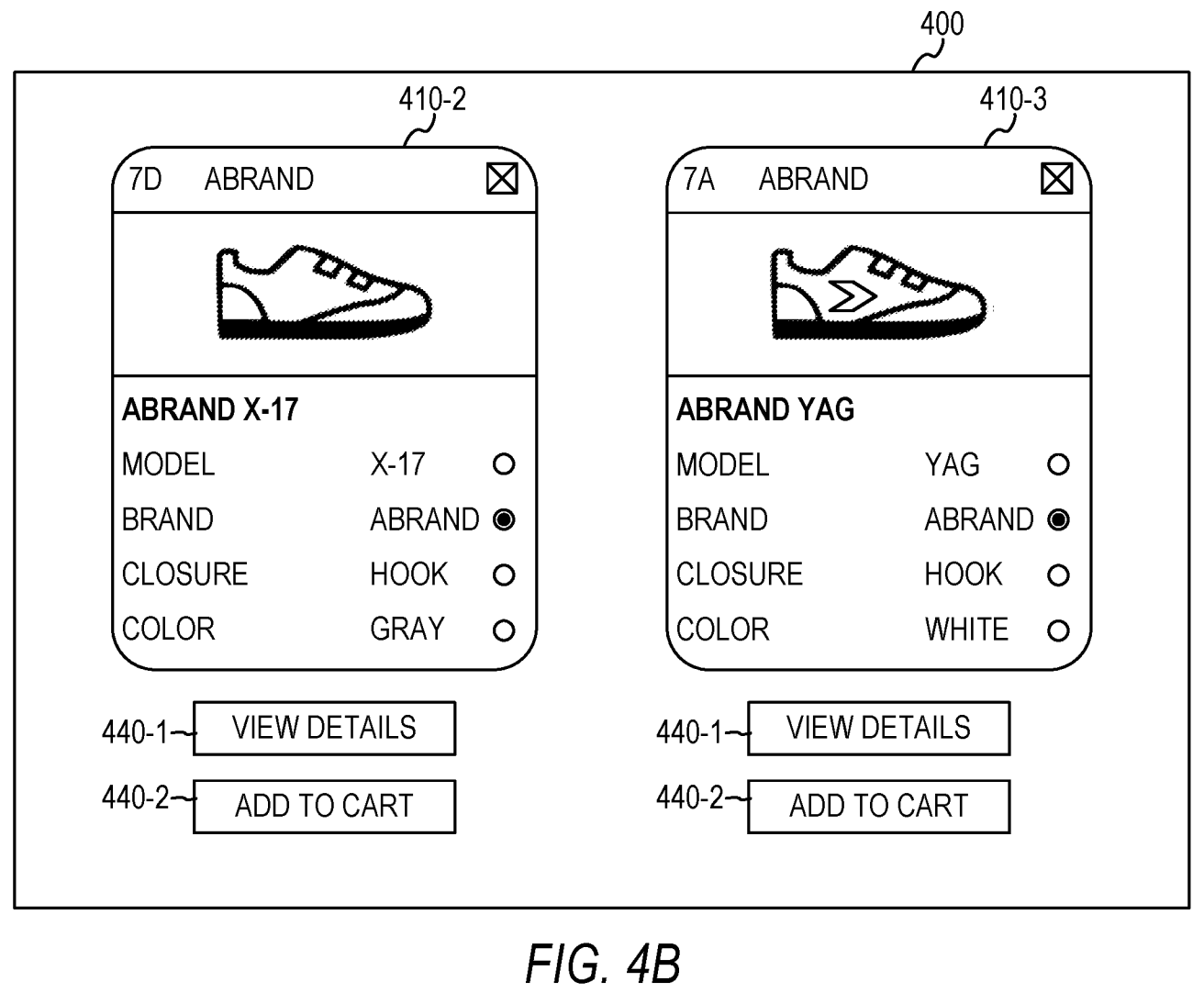

FIGS. 4A-4B illustrate different phases of a user interface 400 for efficiently browsing through and comparing digital content items, in accordance with some example embodiments. In FIG. 4A, the user interface module 310 causes a plurality of cards 410 (e.g., graphical widgets), such as card 410-1 and 410-2, to be displayed concurrently on a computing device of a user. The plurality of cards 410 correspond to different types of shoes. For example, the card 410-1 represents a first type of shoe ("ABRAND M-23"), and the card 410-2 represents a second type of shoe ("ABRAND X-17"). Each card 410 may comprises a corresponding image of the corresponding item (e.g., shoe) of the card 410.

In some example embodiments, each one of the plurality of cards 410 comprises a corresponding identifier 412 for a product or for some other type of item (e.g., a product identification), a corresponding plurality of attribute types 414 (e.g., attribute categories) for the corresponding identifier 412, and a corresponding attribute value 416 for each one of the plurality of attribute types 414. Each identifier 412 may comprise a corresponding product identification. The identifier 412 may comprise text that identifies the item, such as a combination of the brand and model of the item (e.g., "ABRAND M-23" in FIG. 4A). However, other types of identifiers 412 are also within the scope of the present disclosure.

The attribute types 414 may comprise different categories of attributes of the item. For example, in FIG. 4A, the cards 410 each have attribute types 414-1, 414-2, 414-3, and 414-4. The attribute type 414-1 comprises a shoe model, the attribute type 414-2 comprises a shoe brand, the attribute type 414-3 comprises type of closing mechanism for the shoe, and the attribute type 414-4 comprises a color of the shoe. Other types, configurations, and combinations of attribute type 414 are also within the scope of the present disclosure.

The attribute values 416 may comprise different values for the attribute types 414 of the item. For example, in FIG. 4A, the cards 410 each have attribute values 416-1, 416-2, 416-3, and 416-4 corresponding to the attribute types 414-1, 414-2, 414-3, and 414-4, respectively. The attribute value 416-1 represents the item of the card 410-1 as having a shoe model of "M-32." The attribute value 416-2 represents the item of the card 410-1 as having a shoe brand of "ABRAND." The attribute value 416-3 represents the item of the card 410-1 as having a closing mechanism of "LACES." The attribute value 416-4 represents the item of the card 410-1 as having a color of "WHITE."

In some example embodiments, the user interface module 310 is configured to receive, from the computing device, a request for one or more additional cards other than those currently being displayed (e.g., one or more additional cards other than cards 410-1 and 410-2 in FIG. 4A). The user interface module 310 may be configured to receive the request via a network external to the computing device (e.g., via the network 114 in FIG. 1). For example, the user interface module 310 may reside on a server and receive the request from the computing device via the external network. Alternatively, the user interface module 310 may reside on the computing device and receive the request from the computing device without using a network connection external to the computing device.

The request may indicate at least one of the plurality of cards 410 that has selected by the user for concurrent display with the one or more additional cards. For example, the request may indicate that the user has selected card 410-2 for concurrent display with one or more additional cards. The user may select one of the cards 410 for concurrent display with one or more additional cards by selecting a corresponding user interface element. For example, in FIG. 4A, the user may select (e.g., click on or tap) the visual representation of card 410-2 in order to select the card 410-2 for concurrent display with one or more additional cards.

The request may also indicate at least one corresponding attribute value 416 for each one of the at least one of the plurality of cards 410. In some example embodiments, the at least one corresponding attribute value 416 is selected by the user for use in determining the one or more additional cards 410. Each one of the attribute values 416 on each one of the plurality of cards 410 may be selectable via a corresponding selectable user interface element on the corresponding one of the plurality of cards 410. For example, in FIG. 4A, the attribute value "HOOK" for card 410-2 has been selected by the user via selectable user interface element 420 on card 410-2, indicating that the user wants to view one or more additional cards 410 for shoes having hook and loop closures (e.g., one or more additional cards 410 having an attribute value 416-3 of "HOOK" for the attribute category 414-3 of "CLOSURE"). The selection of an attribute value 416 on a card 410 may indicate the selection of the corresponding card 410 for concurrent display with one or more additional cards 410. For example, in FIG. 4A, the user's selection of the attribute value 416-3 on the card 410-2 may indicate the selection of the card 410-2 for concurrent display with one or more additional cards 410.

In some example embodiments, the request is received by the user interface module 310 in response to, or otherwise based on, the user swiping one of the plurality of cards 410 other than the selected card(s) 410. For example, in FIG. 4A, the user may swipe card 410-1 and, as a result, trigger the request. In some other example embodiments, the request is received by the user interface module 310 in response to, or otherwise based on, the user selecting a selectable user interface element 430 configured to remove one of the plurality of cards 410 other than the selected at least one of the plurality of cards 410 from display on the computing device. For example, in FIG. 4A, the user may select the selectable user interface element 430 and, as a result, trigger the request. The request may be received in response to, or otherwise based on, other signals or events as well.

In some example embodiments, the selection module 320 is configured to determine the one or more additional cards 410 from amongst a plurality of additional cards 410 based on the at least one corresponding attribute value 416 indicated by the request. For example, the selection module 320 may use a scoring model to generate corresponding scores for each one of the plurality of additional cards 410, using the indicated attribute value(s) 416 as feature data input for the scoring model, and then select one or more of the plurality of additional cards 410 based on their corresponding scores, such as by ranking the plurality of additional cards 410 based on their corresponding scores, and then selecting a highest ranking portion of the plurality of additional cards 410 to be the additional card(s) 410 to be displayed. The selection module 320 may score each one of the plurality of additional cards 410 based, at least in part, on how much the additional card 410 matches criteria selected by the user, such as how closely the corresponding attribute values 416 of the additional card 410 match the attribute values 416 selected by the user and indicated in the additional card request. Other factors may also be incorporated into and affect the determination of which additional card(s) 410 to display to the user in response to the request.

In some example embodiments, each one of the plurality of cards 410 is configured to enable the user to select any of the attribute values 416 as a filter criterion for determining the one or more additional cards 410. For example, in FIG. 4A, the user may select any of the attribute values 416 as a filter criterion via selection of a corresponding selectable user interface element 418 (e.g., a selectable radio button, a long press action such as the user holding a finger on a visual representation of the attribute value 416 for a few seconds). In some example embodiments, each one of the plurality of cards 410 is configured to enable the user to select any of the attribute values 416 as a preference criterion for determining the one or more additional cards 410. For example, in FIG. 4A, the user may select any of the attribute values 416 of the attribute categories 414 as a preference criterion via selection of a corresponding selectable user interface element 420 (e.g., a selectable area overlaying the attribute value 416).

In some example embodiments, the filter criterion is given more weight than the preference criterion in determining the one or more additional cards 410. The selection of one of the attribute values 416 as the filter criterion may cause cards 410 having the selected one of the attribute values 416 to be selected for inclusion in the one or more additional cards 410 over cards 410 not having the selected one of the attribute values 416, such that the selection module 320 only includes cards 410 not having the filter criterion in the additional card(s) 410 to be displayed if there are no additional cards 410 that have the attribute value 416 of the filter criterion or an insufficient number of additional cards 410 that have the attribute value 416 of the filter criterion. For example, in FIG. 4A, if the user selects attribute value 416 "ABRAND" as a filter criterion, then the selection module 320 may first attempt to select an additional card having a corresponding attribute value of "ABRAND" before selecting an additional card that does not have a corresponding attribute value of "ABRAND."

In some example embodiments, the user interface module 310 is configured to cause the determined one or more additional cards 410 to be displayed concurrently on the computing device along with the at least one of the plurality of cards 410 selected by the user for concurrent display with the one or more additional cards 410. For example, in FIG. 4A, the user may trigger a request for an additional card 410 to be displayed concurrently with the card 410-2, and, in response to the request, the user interface module 310 displays an additional card 410-3 concurrently with the card 410-2 in FIG. 4B. As seen in FIG. 4B, the additional card 410-3 has the attribute values 416 of "ABRAND" and "HOOK" that were selected by the user in FIG. 4A via the user interface elements 418 and 420 on the card 410-2. Each additional card 410 that is displayed may comprise the same type of elements as the originally displayed cards 410, such as an image, a corresponding identifier 412, a plurality of attribute types 414, and a corresponding attribute value 416 for each one of the plurality of attribute types 414.

In some example embodiments, the causing of the determined one or more additional cards 410 to be displayed comprises removing a remaining portion of the plurality of cards 410 other than the selected at least one of the plurality of cards 410 from display on the computing device. For example, in FIG. 4B, the display of the additional card 410-3 includes the removal of the unselected card 410-1 from display on the computing device of the user.

In some example embodiments, the user interface module 310 is configured to determine whether the user has performed a user action directed towards any of the displayed cards 410. Such user actions may include, but are not limited to, viewing additional details of the item of the card 410 and adding the item of the card 410 to an online shopping cart. For example, in FIGS. 4A-4B, the user may select a user interface element 440-1 to view more details of the item or the user interface element 440-2 to add the item to an online shopping cart. Other types of user actions are also within the scope of the present disclosure.

In some example embodiments, the user interface module 310 is configured to store a record of the user action in the database(s) 330 in response to, or otherwise based on, a determination that the user has performed a user action directed towards one of the displayed cards 410. The stored record may include an indication of the user action, as well as the details of its performance, such as an identification of the user who performed the user action, the card 410 to which the user action was directed, and the attribute value(s) 416 that were used in selection of the card 410 for the display that resulted in the user action. In some example embodiments, the selection module 320 is configured to use the stored record to determine one or more additional cards 410. For example, the selection module 320 may modify the scoring model, or another type of model used in selecting the additional card(s) 410, based on the stored record. In some example embodiments, the selection module 320 uses the stored record as training data in a machine learning operation to train such a model, and then uses the trained model for subsequent determinations of additional cards 410 to display.

Figure 5:
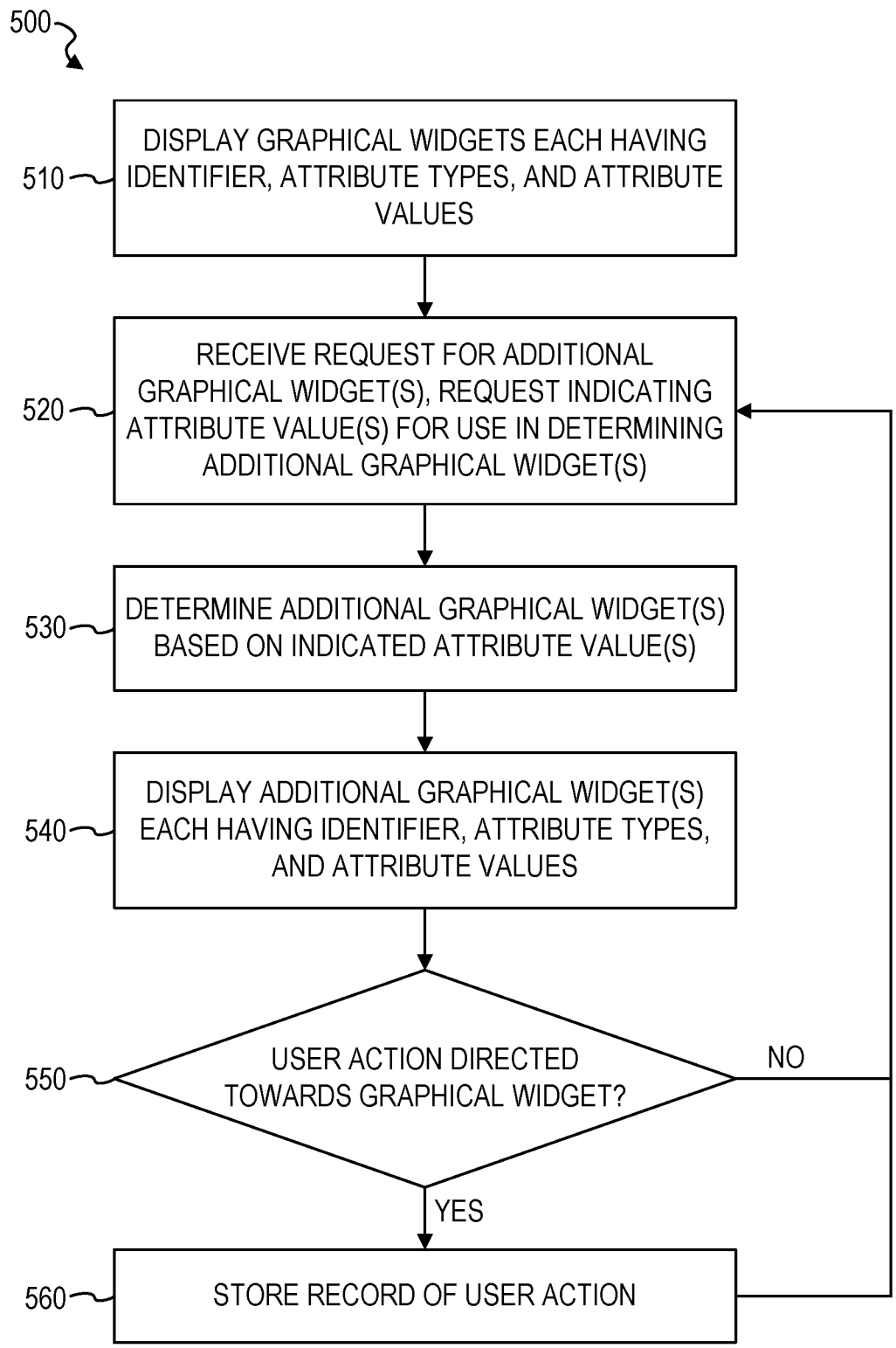
FIG. 5 is a flowchart illustrating a method of implementing an improved user interface for efficiently browsing through and comparing digital content items, in accordance with some example embodiments.

FIG. 5 is a flowchart illustrating a method 500 of implementing an improved user interface for efficiently browsing through and comparing digital content items, in accordance with some example embodiments. The method 500 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 500 are performed by the comparison system 300 of FIG. 3, or any combination of one or more of its modules 310 and 320, as described above.

At operation 510, the comparison system 300 causes a plurality of cards 410 to be displayed concurrently on a computing device of a user (e.g., cards 410-1 and 410-2 in FIG. 4A). In some example embodiments, each one of the plurality of cards 410 comprises a corresponding identifier (e.g., identifier 412 in FIG. 4A), a corresponding plurality of attribute types 414 for the corresponding identifier (e.g., attribute types 414-1, 414-2, 414-3, and 414-4 in FIG. 4A), and a corresponding attribute value 416 for each one of the plurality of attribute types 414 (e.g., attribute values 416-1, 416-2, 416-3, and 416-4 in FIG. 4A). Each one of the plurality of cards 410 may comprise a corresponding graphical widget.

At operation 520, the comparison system 300 receives, from the computing device, a request for one or more additional cards 410. In some example embodiments, the request indicates at least one of the plurality of cards 410 selected by the user for concurrent display with the one or more additional cards 410. The request may also indicate at least one corresponding attribute value 416 for each one of the at least one of the plurality of cards 410. In some example embodiments, the at least one corresponding attribute value 416 has been selected by the user for use in determining the one or more additional cards 410. Each one of the attribute values 416 on each one of the plurality of cards 410 may be selectable via a corresponding selectable user interface element on the corresponding one of the plurality of cards 410 (e.g., the attribute value "HOOK" for card 410-2 has been selected by the user via selectable user interface element 420 on card 410-2 in FIG. 4A).

In some example embodiments, the request is received by the comparison system 300 in response to, or otherwise based on, the user swiping one of the plurality of cards 410 other than the selected at least one of the plurality of cards 410 (e.g., the user swiping card 410-1 in FIG. 4A). In some other example embodiments, the request is received by the comparison system 300 in response to, or otherwise based on, the user selecting a selectable user interface element configured to remove one of the plurality of cards 410 other than the selected at least one of the plurality of cards 410 from display on the computing device (e.g., the user selecting the selectable user interface element 430 in FIG. 4A). The request may be received in response to, or otherwise based on, other signals or events as well.

At operation 530, the comparison system 300 determines the one or more additional cards 410 from amongst a plurality of additional cards 410 based on the at least one corresponding attribute value 416 indicated by the request. For example, the comparison system 300 may use a scoring model to generate corresponding scores for each one of the plurality of additional cards 410, using the indicated attribute value(s) 416 as feature data input for the scoring model, and then select one or more of the plurality of additional cards 410 based on their corresponding scores, such as by ranking the plurality of additional cards 410 based on their corresponding scores, and then selecting a highest ranking portion of the plurality of additional cards 410 to be the additional card(s) 410 to be displayed.

In some example embodiments, each one of the plurality of cards 410 is configured to enable the user to select any of the attribute values 416 as a filter criterion for determining the one or more additional cards 410 (e.g., via the selectable user interface element 418 in FIG. 4A) and to enable the user to select any of the attribute values 416 as a preference criterion for determining the one or more additional cards 410 (e.g., via the selectable user interface element 420 in FIG. 4A). The filter criterion may be given more weight than the preference criterion in determining the one or more additional cards 410. In some example embodiments, the selection of one of the attribute values 416 as the filter criterion causes cards 410 having the selected one of the attribute values 416 to be selected for inclusion in the one or more additional cards 410 over cards 410 not having the selected one of the attribute values 416 (e.g., the comparison system 300 only includes cards 410 not having the filter criterion in the additional card(s) 410 to be displayed if there are no additional cards 410, or an insufficient number of additional cards 410, that have the attribute value 416 of the filter criterion).

At operation 540, the comparison system 300 causes the determined one or more additional cards 410 to be displayed concurrently on the computing device along with the at least one of the plurality of cards 410 selected by the user for concurrent display with the one or more additional cards 410 (e.g., the additional card 410-3 being displayed concurrently with card 410-2 in FIG. 4B). The determined one or more additional cards 410 may each comprise a corresponding identifier 412, the plurality of attribute types 414, and a corresponding attribute value 416 for each one of the plurality of attribute types 414. In some example embodiments, the causing the determined one or more additional cards 410 to be displayed comprises removing a remaining portion of the plurality of cards 410 other than the selected at least one of the plurality of cards 410 from display on the computing device (e.g., the display of the additional card 410-3 in FIG. 4B includes the removal of the unselected card 410-1).

At operation 550, the comparison system 300 determines whether the user has performed a user action directed towards any of the displayed cards 410. Such user actions may include, but are not limited to, viewing additional details of the item of the card 410 (e.g., via selection of the user interface element 440-1 in FIG. 4A to view more details of the product) and adding the item of the card 410 to an online shopping cart (e.g., via selection of the user interface element 440-2 in FIG. 4A to add the item to an online shopping cart). Other types of user actions are also within the scope of the present disclosure. If the comparison system 300 determines that the user has not performed a user action directed towards any of the displayed cards 410, then the method 500 may return to operation 520, where the comparison system 300 receives another request for one or more additional cards 410.

If the comparison system 300 determines that the user has performed a user action directed towards one of the displayed cards 410, then the method 500 may proceed to operation 560, where the comparison system 300 stores a record of the user action in the database(s) 330. The stored record may include an indication of the user action, as well as the details of its performance, such as an identification of the user who performed the user action, the card 410 to which the user action was directed, and the attribute value(s) 416 that were used in selection of the card 410 for the display that resulted in the user action. In some example embodiments, the comparison system 300 then uses the stored record to determine one or more additional cards 410 in a subsequent performance of operation 530. For example, the comparison system 300 may modify the scoring model, or another type of model used in selecting the additional card(s) at operation 530, based on the stored record. In some example embodiments, the comparison system 300 uses the stored record as training data in a machine learning operation to train such a model, and then uses the trained model in a subsequent performance of operation 530 after the method 500 first returns to operation 520.

It is contemplated that any of the other features described within the present disclosure can be incorporated into the method 500.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 6:
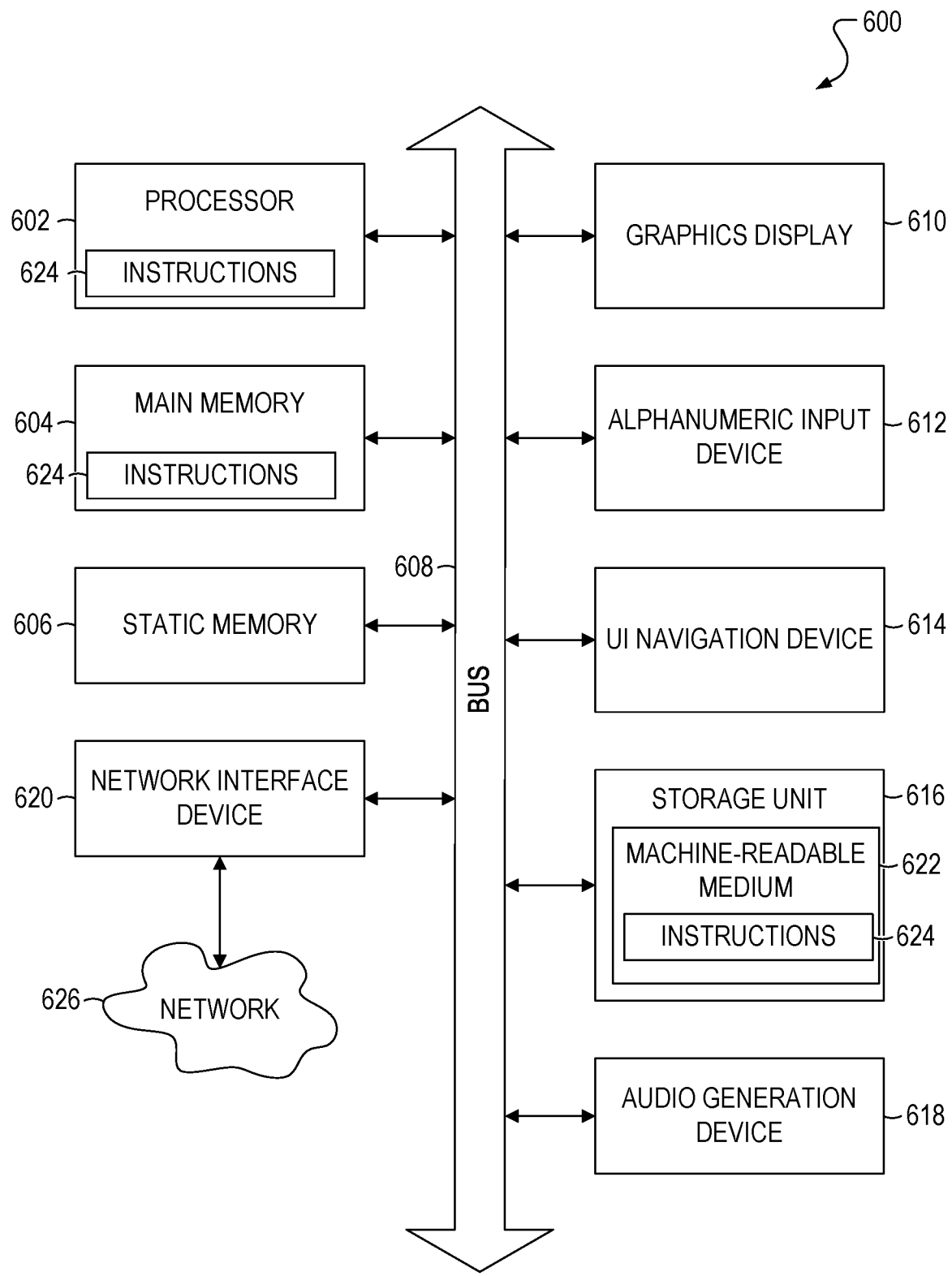
FIG. 6 is a block diagram of an example computer system on which methodologies described herein can be executed, in accordance with some example embodiments.

FIG. 6 is a block diagram of a machine in the example form of a computer system 600 within which instructions 624 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604, and a static memory 606, which communicate with each other via a bus 608. The computer system 600 may further include a graphics or video display unit 610 (e.g., a liquid crystal display (LCD) or a cathode ray tube (CRT)). The computer system 600 also includes an alphanumeric input device 612 (e.g., a keyboard), a user interface (UI) navigation (or cursor control) device 614 (e.g., a mouse), a storage unit (e.g., a disk drive unit) 616, an audio or signal generation device 618 (e.g., a speaker), and a network interface device 620.

The storage unit 616 includes a machine-readable medium 622 on which is stored one or more sets of data structures and instructions 624 (e.g., software) embodying or utilized by any one or more of the methodologies or functions described herein. The instructions 624 may also reside, completely or at least partially, within the main memory 604 and/or within the processor 602 during execution thereof by the computer system 600, the main memory 604 and the processor 602 also constituting machine-readable media. The instructions 624 may also reside, completely or at least partially, within the static memory 606.

While the machine-readable medium 622 is shown in an example embodiment to be a single medium, the term "machine-readable medium" may include a single medium or multiple media (e.g., a centralized or distributed database, and/or associated caches and servers) that store the one or more instructions 624 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 624 may further be transmitted or received over a communications network 626 using a transmission medium. The instructions 624 may be transmitted using the network interface device 620 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions for execution by the machine, and includes digital or analog communications signals or other intangible media to facilitate communication of such software.

Each of the features and teachings disclosed herein can be utilized separately or in conjunction with other features and teachings to provide a system and method for blind spot implementation in neural networks. Representative examples utilizing many of these additional features and teachings, both separately and in combination, are described in further detail with reference to the attached figures. This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Some portions of the detailed descriptions herein are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the below discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk, including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The example methods or algorithms presented herein are not inherently related to any particular computer or other apparatus. Various general purpose systems, computer servers, or personal computers may be used with programs in accordance with the teachings herein, or it may prove convenient to construct a more specialized apparatus to perform the method steps disclosed herein. The structure for a variety of these systems will appear from the description herein. It will be appreciated that a variety of programming languages may be used to implement the teachings of the disclosure as described herein.

Moreover, the various features of the representative examples and the dependent claims may be combined in ways that are not specifically and explicitly enumerated in order to provide additional useful embodiments of the present teachings. It is also expressly noted that all value ranges or indications of groups of entities disclose every possible intermediate value or intermediate entity for the purpose of original disclosure, as well as for the purpose of restricting the claimed subject matter. It is also expressly noted that the dimensions and the shapes of the components shown in the figures are designed to aid in understanding how the present teachings are practiced, but not intended to limit the dimensions and the shapes shown in the examples.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The following paragraphs provide example embodiments.

Example 1 includes a computer-implemented method comprising: causing, by at least one hardware processor, a plurality of graphical widgets to be displayed concurrently on a computing device of a user, each one of the plurality of graphical widgets comprising a corresponding identifier, a corresponding plurality of attribute types for the corresponding identifier, and a corresponding attribute value for each one of the plurality of attribute types; receiving, by the at least one hardware processor from the computing device, a request for one or more additional graphical widgets, the request indicating at least one of the plurality of graphical widgets selected by the user for concurrent display with the one or more additional graphical widgets, the request also indicating at least one corresponding attribute value for each one of the at least one of the plurality of graphical widgets, the at least one corresponding attribute value having been selected by the user for use in determining the one or more additional graphical widgets; determining, by the at least one hardware processor, the one or more additional graphical widgets from amongst a plurality of additional graphical widgets based on the at least one corresponding attribute value indicated by the request; and causing, by the at least one hardware processor, the determined one or more additional graphical widgets to be displayed concurrently on the computing device along with the at least one of the plurality of graphical widgets selected by the user for concurrent display with the one or more additional graphical widgets, the determined one or more additional graphical widgets each comprising a corresponding identifier, the plurality of attribute types, and a corresponding attribute value for each one of the plurality of attribute types.

Example 2 includes the computer-implemented method of example 1, wherein the causing the determined one or more additional graphical widgets to be displayed comprises removing a remaining portion of the plurality of graphical widgets other than the selected at least one of the plurality of graphical widgets from display on the computing device.

Example 3 includes the computer-implemented method of example 1 or example 2, wherein the request is received in response to, or otherwise based on, the user swiping one of the plurality of graphical widgets other than the selected at least one of the plurality of graphical widgets.

Example 4 includes the computer-implemented method of any one of examples 1 to 3, wherein the request is received in response to the user selecting a selectable user interface element configured to remove one of the plurality of graphical widgets other than the selected at least one of the plurality of graphical widgets from display on the computing device.

Example 5 includes the computer-implemented method of any one of examples 1 to 4, wherein each attribute value is selectable via a corresponding selectable user interface element on the corresponding one of the plurality of graphical widgets.

Example 6 includes the computer-implemented method of any one of examples 1 to 5, wherein each one of the plurality of graphical widgets is configured to enable the user to select any of the attribute values as a filter criterion for determining the one or more additional graphical widgets and to enable the user to select any of the attribute values as a preference criterion for determining the one or more additional graphical widgets, the filter criterion having more weight than the preference criterion in determining the one or more additional graphical widgets.

Example 7 includes the computer-implemented method of any one of examples 1 to 6, wherein selection of one of the attribute values as the filter criterion causes graphical widgets having the selected one of the attribute values to be selected for inclusion in the one or more additional graphical widgets over graphical widgets not having the selected one of the attribute values.

Example 8 includes a system comprising: at least one processor; and a non-transitory computer-readable medium storing executable instructions that, when executed, cause the at least one processor to perform the method of any one of examples 1 to 7.

Example 9 includes a non-transitory machine-readable storage medium, tangibly embodying a set of instructions that, when executed by at least one processor, causes the at least one processor to perform the method of any one of examples 1 to 7.

Example 10 includes a machine-readable medium carrying a set of instructions that, when executed by at least one processor, causes the at least one processor to carry out the method of any one of examples 1 to 7.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method comprising:
    displaying, by at least one hardware processor, a plurality of graphical widgets concurrently on a computing device of a user, each one of the plurality of graphical widgets comprising a corresponding identifier, a corresponding plurality of attribute types for the corresponding identifier, and a corresponding attribute value for each one of the plurality of attribute types, each one of the plurality of graphical widgets comprises a corresponding filter user interface element for each one of the attribute values of the plurality of attribute types and a corresponding preference user interface element for each one of the attribute values of the plurality of attribute types, each one of the filter user interface elements corresponding to the attribute values of the plurality of attribute types being configured to designate the corresponding attribute value as a filter criterion based on user selection of the one of the filter user interface elements, and each one of the preference user interface elements corresponding to the attribute values of the plurality of attribute types being-configured to designate the corresponding attribute value as a preference criterion based on user selection of the one of the preference user interface elements, the corresponding filter user interface elements for the attribute values of the plurality of attribute types and the corresponding preference user interface elements all being selectable from a single graphical user interface without the user having to navigate to another graphical user interface via the computing device;
    receiving, by the at least one hardware processor from the computing device, a request for one or more additional graphical widgets, the request indicating at least one of the plurality of graphical widgets selected by the user for concurrent display with the one or more additional graphical widgets, the request also indicating at least one corresponding attribute value for each one of the at least one of the plurality of graphical widgets, the at least one corresponding attribute value having been selected by the user for use in determining the one or more additional graphical widgets;
    determining, by the at least one hardware processor, the one or more additional graphical widgets from amongst a plurality of additional graphical widgets based on the at least one corresponding attribute value indicated by the request and the plurality of graphical widgets, the filter criterion having more weight than the preference criterion in determining the one or more additional graphical widgets; and
    displaying, by the at least one hardware processor, the determined one or more additional graphical widgets concurrently on the computing device along with the at least one of the plurality of graphical widgets selected by the user for concurrent display with the one or more additional graphical widgets, the determined one or more additional graphical widgets each comprising a corresponding identifier, the plurality of attribute types, and a corresponding attribute value for each one of the plurality of attribute types, the displaying the determined one or more additional graphical widgets comprises removing a remaining portion of the plurality of graphical widgets other than the selected at least one of the plurality of graphical widgets from display on the computing device.

2. The computer-implemented method of claim 1, wherein the request is received in response to the user swiping one of the plurality of graphical widgets other than the selected at least one of the plurality of graphical widgets.

3. The computer-implemented method of claim 1, wherein the request is received in response to the user selecting a selectable user interface element configured to remove one of the plurality of graphical widgets other than the selected at least one of the plurality of graphical widgets from display on the computing device.

4. The computer-implemented method of claim 1, wherein each attribute value is selectable via a corresponding selectable user interface element on the corresponding one of the plurality of graphical widgets.

5. The computer-implemented method of claim 1, wherein selection of one of the attribute values as the filter criterion causes graphical widgets having the selected one of the attribute values to be selected for inclusion in the one or more additional graphical widgets over graphical widgets not having the selected one of the attribute values.

6. A system comprising:
   at least one hardware processor; and
   a non-transitory computer-readable medium storing executable instructions that, when executed, cause the at least one processor to perform operations comprising:
      displaying a plurality of graphical widgets concurrently on a computing device of a user, each one of the plurality of graphical widgets comprising a corresponding identifier, a corresponding plurality of attribute types for the corresponding identifier, and a corresponding attribute value for each one of the plurality of attribute types, each one of the plurality of graphical widgets comprises a corresponding filter user interface element for each one of the attribute values of the plurality of attribute types and a corresponding preference user interface element for each one of the attribute values of the plurality of attribute types, each one of the filter user interface elements corresponding to the attribute values of the plurality of attribute types being configured to designate the corresponding attribute value as a filter criterion based on user selection of the one of the filter user interface elements, and each one of the preference user interface elements corresponding to the attribute values of the plurality of attribute types being-configured to designate the corresponding attribute value as a preference criterion based on user selection of the one of the preference user interface elements, the corresponding filter user interface elements for the attribute values of the plurality of attribute types and the corresponding preference user interface elements all being selectable from a single graphical user interface without the user having to navigate to another graphical user interface via the computing device;
      receiving, from the computing device, a request for one or more additional graphical widgets, the request indicating at least one of the plurality of graphical widgets selected by the user for concurrent display with the one or more additional graphical widgets, the request also indicating at least one corresponding attribute value for each one of the at least one of the plurality of graphical widgets, the at least one corresponding attribute value having been selected by the user for use in determining the one or more additional graphical widgets;
      determining the one or more additional graphical widgets from amongst a plurality of additional graphical widgets based on the at least one corresponding attribute value indicated by the request and the plurality of graphical widgets, the filter criterion having more weight than the preference criterion in determining the one or more additional graphical widgets; and
      displaying the determined one or more additional graphical widgets concurrently on the computing device along with the at least one of the plurality of graphical widgets selected by the user for concurrent display with the one or more additional graphical widgets, the determined one or more additional graphical widgets each comprising a corresponding identifier, the plurality of attribute types, and a corresponding attribute value for each one of the plurality of attribute types, the displaying the determined one or more additional graphical widgets comprises removing a remaining portion of the plurality of graphical widgets other than the selected at least one of the plurality of graphical widgets from display on the computing device.

7. The system of claim 6, wherein the request is received in response to the user swiping one of the plurality of graphical widgets other than the selected at least one of the plurality of graphical widgets.

8. The system of claim 6, wherein the request is received in response to the user selecting a selectable user interface element configured to remove one of the plurality of graphical widgets other than the selected at least one of the plurality of graphical widgets from display on the computing device.

9. The system of claim 6, wherein each attribute value is selectable via a corresponding selectable user interface element on the corresponding one of the plurality of graphical widgets.

10. The system of claim 6, wherein selection of one of the attribute values as the filter criterion causes graphical widgets having the selected one of the attribute values to be selected for inclusion in the one or more additional graphical widgets over graphical widgets not having the selected one of the attribute values.

11. A non-transitory machine-readable storage medium, tangibly embodying a set of instructions that, when executed by at least one hardware processor, causes the at least one processor to perform operations comprising:
    displaying a plurality of graphical widgets concurrently on a computing device of a user, each one of the plurality of graphical widgets comprising a corresponding identifier, a corresponding plurality of attribute types for the corresponding identifier, and a corresponding attribute value for each one of the plurality of attribute types, each one of the plurality of graphical widgets comprises a corresponding filter user interface element for each one of the attribute values of the plurality of attribute types and a corresponding preference user interface element for each one of the attribute values of the plurality of attribute types, each one of the filter user interface elements corresponding to the attribute values of the plurality of attribute types being configured to designate the corresponding attribute value as a filter criterion based on user selection of the one of the filter user interface elements, and each one of the preference user interface elements corresponding to the attribute values of the plurality of attribute types being-configured to designate the corresponding attribute value as a preference criterion based on user selection of the one of the preference user interface elements, the corresponding filter user interface elements for the attribute values of the plurality of attribute types and the corresponding preference user interface elements all being selectable from a single graphical user interface without the user having to navigate to another graphical user interface via the computing device;

receiving, from the computing device, a request for one or more additional graphical widgets, the request indicating at least one of the plurality of graphical widgets selected by the user for concurrent display with the one or more additional graphical widgets, the request also indicating at least one corresponding attribute value for each one of the at least one of the plurality of graphical widgets, the at least one corresponding attribute value having been selected by the user for use in determining the one or more additional graphical widgets;

determining the one or more additional graphical widgets from amongst a plurality of additional graphical widgets based on the at least one corresponding attribute value indicated by the request and the plurality of graphical widgets, the filter criterion having more weight than the preference criterion in determining the one or more additional graphical widgets; and displaying the determined one or more additional graphical widgets concurrently on the computing device along with the at least one of the plurality of graphical widgets selected by the user for concurrent display with the one or more additional graphical widgets, the determined one or more additional graphical widgets each comprising a corresponding identifier, the plurality of attribute types, and a corresponding attribute value for each one of the plurality of attribute types, the displaying the determined one or more additional graphical widgets comprises removing a remaining portion of the plurality of graphical widgets other than the selected at least one of the plurality of graphical widgets from display on the computing device.

12. The non-transitory machine-readable storage medium of claim 11, wherein the request is received in response to the user swiping one of the plurality of graphical widgets other than the selected at least one of the plurality of graphical widgets.

13. The non-transitory machine-readable storage medium of claim 11, wherein the request is received in response to the user selecting a selectable user interface element configured to remove one of the plurality of graphical widgets other than the selected at least one of the plurality of graphical widgets from display on the computing device.

14. The non-transitory machine-readable storage medium of claim 11, wherein each attribute value is selectable via a corresponding selectable user interface element on the corresponding one of the plurality of graphical widgets.

15. The computer-implemented method of claim 1, wherein each one of the plurality of widgets is configured to enable the user to select any of the attribute values as the filter criterion using a first type of user interface element, and to enable the user to select any of the attribute values as the preference criterion using a second type of user interface element that is different from the first type of user interface element.

16. The system of claim 6, wherein each one of the plurality of widgets is configured to enable the user to select any of the attribute values as the filter criterion using a first type of user interface element, and to enable the user to select any of the attribute values as the preference criterion using a second type of user interface element that is different from the first type of user interface element.

17. The non-transitory machine-readable storage medium of claim 11, wherein each one of the plurality of widgets is configured to enable the user to select any of the attribute values as the filter criterion using a first type of user interface element, and to enable the user to select any of the attribute values as the preference criterion using a second type of user interface element that is different from the first type of user interface element.

* * * * *